United States Patent
Collison et al.

(10) Patent No.: US 10,094,126 B2
(45) Date of Patent: *Oct. 9, 2018

(54) SYSTEM FOR FORMING FLOOR UNDERLAYMENT

(71) Applicant: MP Global Products, L.L.C., Norfolk, NE (US)

(72) Inventors: Alan B. Collison, Pierce, NE (US); Akiva Pinto, Jerusalem (IL); Reid Borgman, Norfolk, NE (US)

(73) Assignee: MP Global Products, L.L.C., Norfolk, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,575

(22) Filed: Sep. 26, 2017

(65) Prior Publication Data

US 2018/0016799 A1 Jan. 18, 2018

Related U.S. Application Data

(60) Continuation-in-part of application No. 15/439,346, filed on Feb. 22, 2017, now Pat. No. 9,771,727, which is a continuation of application No. 15/212,523, filed on Jul. 18, 2016, now Pat. No. 9,580,917, which is a continuation of application No. 14/459,590, filed on Aug. 14, 2014, now Pat. No. 9,394,690, which is a division of application No. 13/303,561, filed on Nov. 23, 2011, now Pat. No. 8,808,826.

(60) Provisional application No. 62/419,894, filed on Nov. 9, 2016.

(51) Int. Cl.
| | |
|---|---|
| *E04F 15/22* | (2006.01) |
| *E04F 15/18* | (2006.01) |
| *E04B 1/66* | (2006.01) |
| *B32B 21/10* | (2006.01) |
| *E04C 2/24* | (2006.01) |
| *E04C 2/16* | (2006.01) |

(52) U.S. Cl.
CPC ............ *E04F 15/225* (2013.01); *B32B 21/10* (2013.01); *E04B 1/665* (2013.01); *E04C 2/16* (2013.01); *E04C 2/243* (2013.01); *E04C 2/246* (2013.01); *E04F 15/182* (2013.01); *B32B 2260/021* (2013.01); *B32B 2262/02* (2013.01); *B32B 2307/7246* (2013.01); *B32B 2471/04* (2013.01); *Y10T 156/1067* (2015.01); *Y10T 156/1087* (2015.01); *Y10T 428/237* (2015.01); *Y10T 428/24967* (2015.01); *Y10T 428/249921* (2015.04); *Y10T 428/253* (2015.01); *Y10T 428/254* (2015.01); *Y10T 428/26* (2015.01); *Y10T 428/265* (2015.01); *Y10T 442/60* (2015.04)

(58) Field of Classification Search
CPC ...... E04F 15/225; E04F 15/182; B32B 21/10; B32B 2260/021; B32B 2262/02; B32B 2307/7246; B32B 2471/04; E04B 1/665; E04C 2/16; E04C 2/243; E04C 2/246; Y10T 428/237; Y10T 428/24967; Y10T 428/253; Y10T 428/254; Y10T 428/26; Y10T 428/265; Y10T 428/249921; Y10T 156/1067; Y10T 156/1087
USPC .......................................................... 428/215
See application file for complete search history.

(56) References Cited

U.S. PATENT DOCUMENTS

| | | | |
|---|---|---|---|
| 4,684,489 A | 8/1987 | Walter | |
| 6,562,173 B1 | 5/2003 | Collison et al. | |
| 6,986,229 B2 | 1/2006 | Collison et al. | |
| 7,458,317 B2 | 12/2008 | Sebastian et al. | |
| 8,808,826 B2* | 8/2014 | Pinto ........................ | E04C 2/16 156/259 |
| 9,394,690 B2* | 7/2016 | Pinto ........................ | E04C 2/16 |
| 9,580,917 B2* | 2/2017 | Pinto ........................ | E04C 2/16 |
| 9,771,727 B2* | 9/2017 | Pinto ....................... | E04F 15/18 |
| 2004/0172905 A1 | 9/2004 | Collison | |

FOREIGN PATENT DOCUMENTS

WO    WO2000/06353    2/2000

OTHER PUBLICATIONS

International Search Report for PCT/US2012/066240, dated Feb. 28, 2013.
Written Opinion of the International Searching Authority for PCT/US2012/066240, dated Feb. 28, 2013.

\* cited by examiner

*Primary Examiner* — Leszek Kiliman
(74) *Attorney, Agent, or Firm* — Harness, Dickey & Pierce, P.L.C.

(57) ABSTRACT

A process for making a fibrous panel member and a flooring structure is disclosed. The flooring structure has a subfloor, a surface layer, and an insulative pad disposed between the subfloor and the surface layer. The insulative pad has an MDI binder and reinforcement fibers distributed uniformly and randomly within a first plane. The process includes mixing a porous fiber material with a MDI adhesive. The fiber batt is compressed between a pair of porous belts. Steam and heat are applied to the compressed batt to form a bound flexible batting material.

10 Claims, 2 Drawing Sheets

SYSTEM FOR FORMING FLOOR UNDERLAYMENT

CROSS-REFERENCE TO RELATED APPLICATIONS

This application is a continuation-in-part of U.S. application Ser. No. 15/439,346 filed on Feb. 22, 2017 (now U.S. Pat. No. 9,771,727); which is a continuation of U.S. application Ser. No. 15/212,523 filed on Jul. 18, 2016 (now U.S. Pat. No. 9,580,917); which is a continuation of U.S. application Ser. No. 14/459,590 filed on Aug. 14, 2014 (now U.S. Pat. No. 9,394,690); which is a divisional of U.S. application Ser. No. 13/303,561 on filed Nov. 23, 2011 (now U.S. Pat. No. 8,808,826); and also claims the benefit of U.S. Provisional Application No. 62/419,894 filed on Nov. 9, 2016. The entire disclosures of the above applications are incorporated herein by reference.

FIELD

The present disclosure relates to a system and process for making a flexible textile fibrous matt underlayment and, more particularly, to a machine that can be used to selectively form a flexible textile fibrous batt pad using either adhesive, or alternatively heat, to bind the fibers.

BACKGROUND

This section provides background information related to the present disclosure which is not necessarily prior art. Example embodiments will now be described more fully with reference to the accompanying drawings. As indicated above, processes for preparing floor underlayment, such as medium density floor underlayment, are known to those skilled in this art.

Textile pads are widely used in flooring applications. A pad is desirable when wood flooring is applied over sub flooring. These pads used in flooring applications serve multiple purposes. They may absorb impact, such as from persons walking on the flooring. They may provide sound deadening, and may provide insulating properties against heat transfer. Pads also may accommodate roughness, unevenness, or other flaws in the sub flooring, and may provide a barrier against moisture and dirt. Finally, pads may lessen impact stresses on the flooring to lengthen the life of the flooring and make the flooring appear to be more durable and of a higher quality. Traditionally, these pads are formed when fibers of various sizes and materials are mixed and bound together. The binding can occur using know techniques such as needling or by the use of meltable binder fibers such as polypropylene. These techniques, while functional have several disadvantages which lead to slow throughput, high energy and cost, and environmental emissions.

As stated above, the teachings herein broadly relates to forming textile fiber matt, and particularly medium density fiber matt. Processes for production of medium density fiber matt are well known to the skilled artisan and include the blowline addition of isocyanate binders. Such a process is described, generally, below.

SUMMARY

This section provides a general summary of the disclosure, and is not a comprehensive disclosure of its full scope or all of its features. The present teaching discloses a method for producing a floor underlayment. The method includes providing textile fibers to a blowline. Optionally, polymeric MDI containing binder having a diisocyanate content of less than about 20% by weight is mixed with the textile fibers in the blowline to treat the textile fibers. The fiber/MDI is at least partially dried. The treated fibers are pressed and subjected to steam to activate the adhesive and bind the fibers to provide a flexible textile batt.

According to the teachings above, the polymeric MDI containing binder can have a diisocyanate content of about 10% by weight or less which allows for a flexible and, therefore, rollable textile product.

According to the teachings above, wherein the polymeric MDI containing binder has a diisocyanate content of about 8% by weight or less.

According to the teachings above, wherein the polymeric MDI containing binder has a diisocyanate content of about 6% by weight or less.

According to the teachings above, wherein the polymeric MDI containing binder is emulsifiable. Further areas of applicability will become apparent from the description provided herein. The description and specific examples in this summary are intended for purposes of illustration only and are not intended to limit the scope of the present disclosure.

According to the present teachings, a flooring material having a textile pad substructure with a density of greater than 13 pounds per cubic foot is provided according to a first aspect of the teachings. The insulative textile flooring pad has reinforcement fibers and a MDI binder.

Further, a flooring structure is disclosed. The flooring structure has a subfloor, a surface layer, and an insulative pad disposed between the subfloor and the surface layer. The insulative pad has MDI binder and reinforcement fibers distributed uniformly and randomly within a first plane. The fiber pad can be water resistant and be flexible and elastically deformable under its own weight.

Further disclosed is a floor underlayment for disposal under a floor surface. The floor underlayment has less than 8% by weight MDI adhesive and more than 85% reinforcement fibers. The floor underlayment has a first surface disposed adjacent to the floor surface and has a density of greater than 13.3 pounds per cubic foot. According to the present teachings, the containers, shipping containers, insulative materials, and insulative constructions described above or below or produced using the methods described above and below, further have a recycling-compatible or water soluble adhesive layer disposed between the paper layer and the corrugated cardboard.

According to an alternate teaching, in the methods described above or below, the methods include placing lose ground-up fibrous cellulous paper or ground-up cardboard material onto a moving conveyor. The fibers in the fibrous paper or cellulous material can be interlocked by methods such a needling or by use of a melted binder fiber, a bioresorbable adhesive, recycling-compatible, water soluble adhesive, plant based (sugar or pectin) adhesive from, for example, sugar beet, corn, or sugar cane, or starch. The ground up cellulous paper or cardboard material is formed into a slab or batt by passing the continuous layer of material between a pair of tapered edge plates which forms the batt width and thickness of the uncompressed batt. This material can have its thickness and density adjusted using a compression roller which can apply heat.

According to the present teachings, containers, shipping containers, insulative materials, and insulative constructions described above or below or produced using the methods described above and below, include a paper layer that can be disposed over the batt, overlapping the expanded portions of the batt underneath all four sides. The ends of the paper layer can be wrapped about and tucked under the ends of the batt. Heat or recycling-compatible or water soluble adhesive can be applied to fix the inner paper layer to the batt.

According to an alternate teaching, in the methods described above or below, the methods include positioning another paper layer about the outside of the folded batt. The outer paper layer can be positioned about the batt on the inner paper layer in a manner which forms a closable flap. This closable flap can include a recycling-compatible or water soluble adhesive in the form of dual sided tape.

According to an alternate teaching, in the methods described above or below, the methods include encapsulating the insulative batt material between the inner and outer paper layer. In this regard, the edge of the outer paper layer can be coupled to the inner paper layer using heat or recycling-compatible or water soluble adhesive, or stitching. Excess material along the edges can be removed.

Further disclosed is an apparatus for forming a plurality of textile pads from a textile batt according to another aspect of the invention. The apparatus comprises a pair of feed rollers for receiving a textile batt and an adhesive activator positioned upstream of the pair of feed rollers that is capable of activating an adhesive on a portion of the fibers. A vapor barrier supply is optionally positioned downstream of the adhesive activator that is capable of supplying vapor barrier material that contacts the outer surfaces of the partial thickness textile batts, and pressure rollers positioned downstream of the vapor barrier supply that are capable of partially compressing the partial thickness textile batts to bond to the vapor barrier to the fibers.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
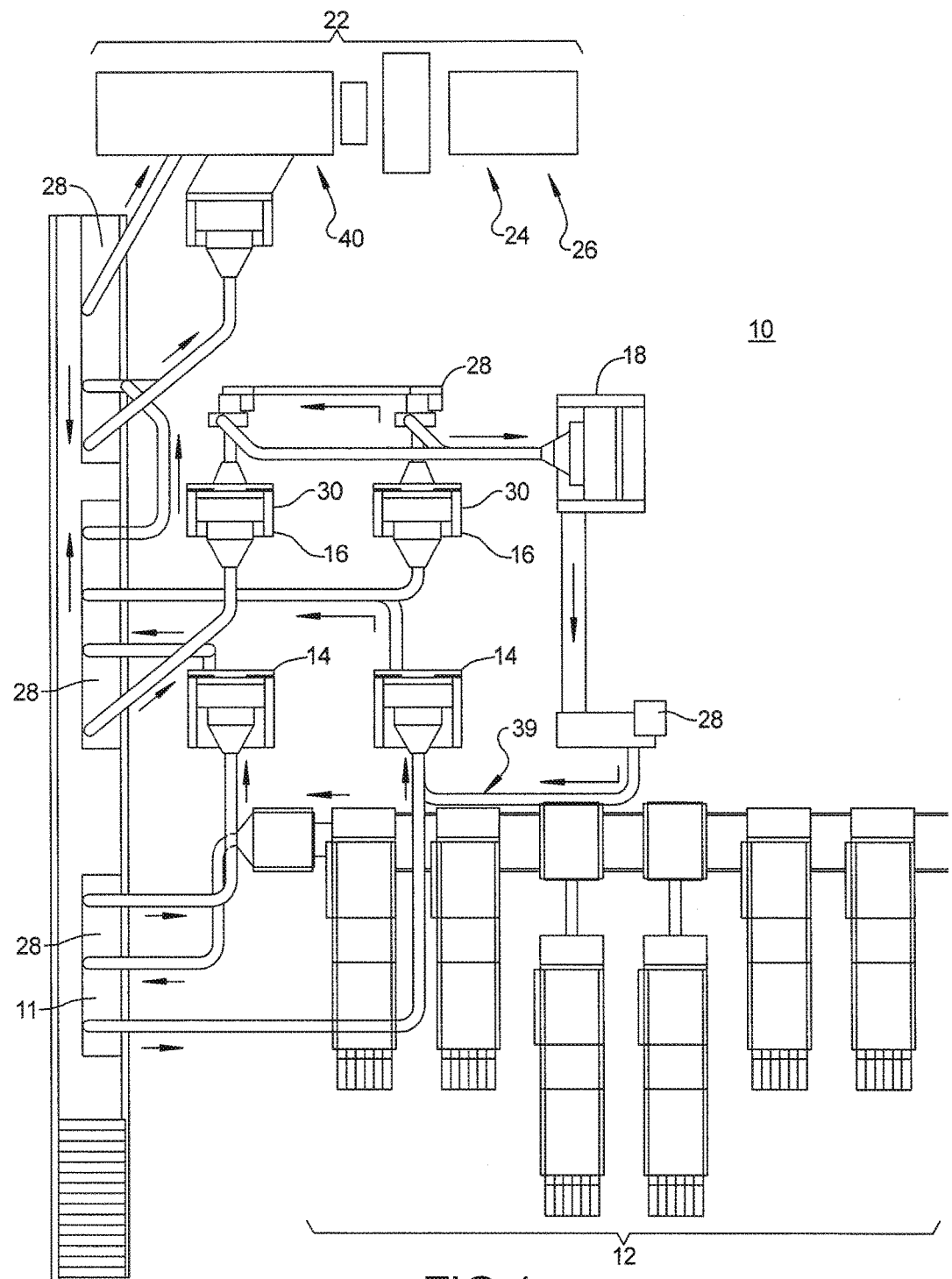
FIG. 1 represents the system according to the present teachings.
Figure 2:
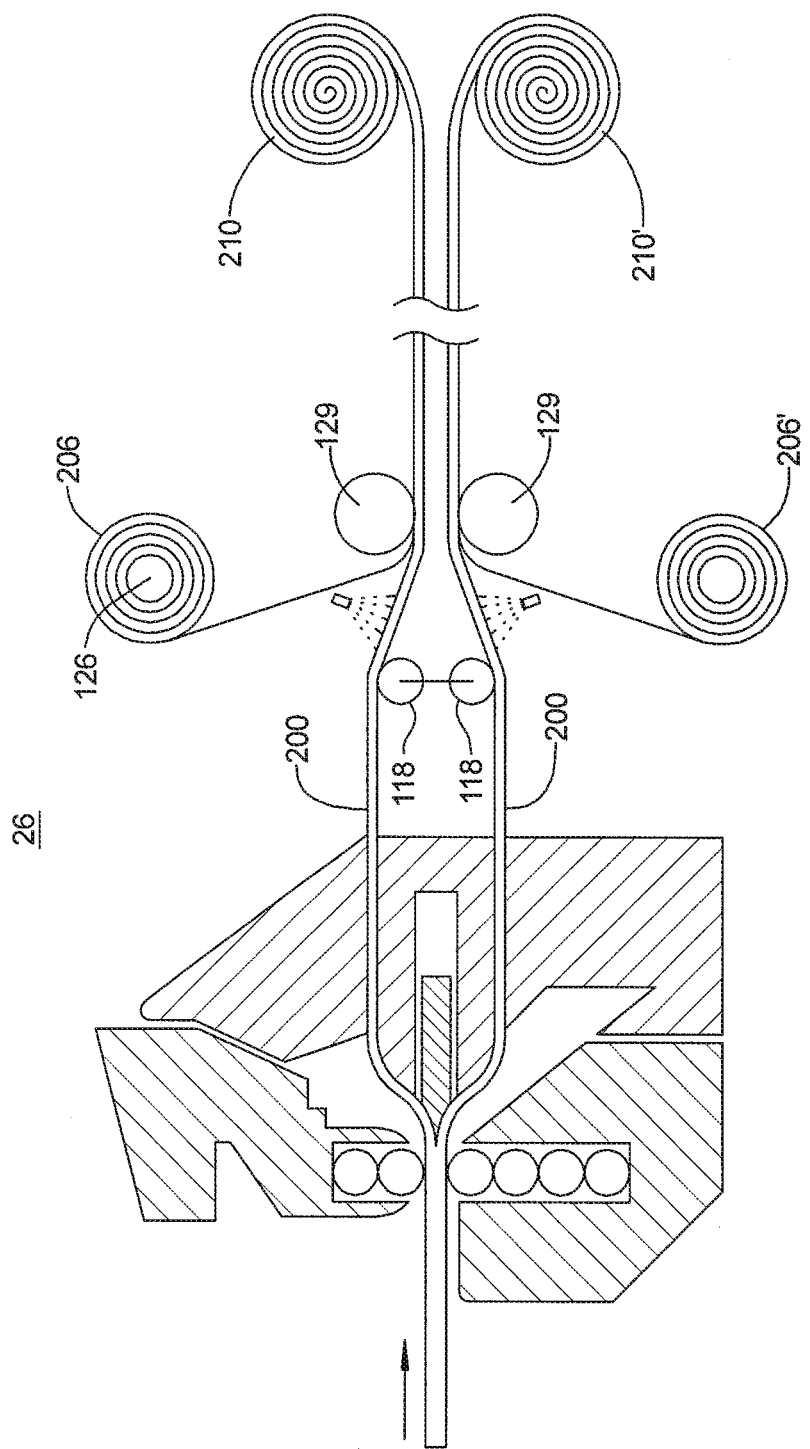
FIG. 2 represents a forming machine used in the system shown in FIG. 1.

FIG. 1 represents a system for forming a floor underlayment or insulation according to the present teachings. The system 10 can be generally divided into blending operations 12, mixing operations 14, fine opening operations 16, adhesive application operations 18, adhesive tempering operation 20, forming operation 22, adhesive activation operation 24, and splitting and rolling 26.

The system has a first section 6 which is issued to form a textile fiber matt which has reinforcement and binding fibers and a second section 8 which uses an adhesive binder to form the textile fiber matt. As such, an aperture is able to selectively run the first section 6 to form a fiber batt using binding fibers or the second section to form the batt using an adhesive.

In producing medium density fiber matt, a polyisocyanate resin is applied directly to the textile fiber material in the fiber transportation system of the refiner of a fiber matt manufacturing plant. Generally, fibrous textile materials used to form the batt are first screened to remove therefrom both oversized and undersized material, e.g., fines and dirt. The textile fibers also can be subjected to a preliminary washing step.

The cleaned fibers are conveyed to storage bins that feed pressurized fibers into a blending operation 12, which can be of a conventional design. The blending operation 12 refines the raw textile fiber material into fiber under air pressure of gravity feed. Generally, the blending operation 12 is usable for both the first 6 and second 8 sections of the system 10. In this regard, the blending operation 12 can be used to vary the mixture of the fibers depending on the material properties of the final product. The fibers pass from the blending operation 12 into the refining section while still under pressure, and this pressure is maintained during the mixing operation 14. A baffle 11 is then used to direct the fiber to individual mixing machines assigned to the first 6 or second 8 system section.

In the blending operation 12, textile fibers of varying denier, length and materials are combined in the mixing operation 14 into a generally randomly distributed mixture. The constituents of the fibers can be natural such as cotton, wool or jute, or they may be polymer based, for example nylon, polyester, or recycled paper or cardboard etc. A loose fibrous mixture of fibers is transported through the system using a series of transport blowers 28. After the mixing operation 14, the fibers are transferred to a fine opening machine 30 which opens the fibers and prepares them for adhesive application.

Once opened, the fibers are again transported via a transport blower 28 to the adhesive application operation 18. At this operation, the temperature of the fibers is elevated an adhesive such as MDI is applied to the mixed opened fibers or binder fibers mixed therewith. While the percentage of adhesive such as MDI applied can be varied based on the required density of the end product, it is envisioned that less than 20% and, more particularly, less than 10% and, even more particularly, 4-7% by weight adhesive can be applied to the fibers to allow the matt to be flexible.

After application of the MDI or adhesive, the fiber adhesive mixture is transferred to a drying conveyor. The drying conveyor allows an initial cooling of the fiber adhesive mixture. After drying, the fiber adhesive mixture is again mixed to ensure proper distribution of the adhesive throughout the fibers.

Alternatively, the fibers can be bound using recycling-compatible or water soluble adhesive or binder fibers such as bicomomponent fibers. The fibrous paper or cellulous material is formed into a slab 10 by passing the continuous layer of material between a pair of tapered edge plates that form the batt width. The thickness of the uncompressed slab can be defined by an upper rake or block 14. This material can then have its thickness and density adjusted using a compression roller 16. As evident from the above description, the pad 46 is covered by the paper layer 44 on the inside with paper layer 44 extending laterally beyond the pad 46 to lie coextensive with the marginal edges of the paper layer 42 so all marginal edges can be heat sealed together. Paper layer 44 extends around the longitudinal extremities of the pad 46 so that the end portions 82 of the paper layer 44 lie between the pad 46 and the outer paper layer 42 when the pad 46 is located in the mailer 40. These portions 70 enable the paper layer 44 to be heat sealed together with the paper layer 42 around the mailer opening 54, thereby entrapping the pad 46. The portion of the opening 26 that lies with the flap 56 has pressure-sensitive, biodegradable tape 59 (covered with a protective strip 64) in order to seal the top edges of the inner paper layer 44 together before the flap 56 is sealed to the front of the mailer 40.

The fibers of the pad 46 can, for example, be about 75% recyclable cardboard and paper fiber and about 25% binder fiber having a density of about 1600 grams per square (GSM) i.e., (75/25). Additional fiber material construction can be about 80/20 recyclable cardboard/paper fiber and binder fiber at about 1500 GSM; about 80/20 recyclable cardboard/paper fiber and binder fiber at about 1400 GSM; about 85/15 recyclable cardboard/paper fiber and binder fiber at about 1600 GSM; about 85/15 recyclable cardboard/paper fiber and binder fiber at about 1500 GSM; about 85/15 recyclable cardboard/paper fiber and binder fiber at about 1400 GSM; and about 90/10 recyclable cardboard/paper fiber and binder fiber at about 1500 GSM, with the first number being the paper cardboard fiber fraction and second number being the bi-component binder fiber fraction (80/20 is about 80% paper fiber and about 20% bi-component). The cardboard/paper fiber component is made of about 50/50 fiberized cardboard/paper up to about 75/25 fiberized cardboard/paper mix.

The batt material can have a density can be about 25 to about 40 grams per cubic meter (kg/m3), a thickness of about 12.5 to about 75 mm, and have fibers (cardboard and binder) with a denier range of about 1 den to about 3 den. The density of the pad is related to the amount of compression of the batt and the percentage of bonding fibers.

Preferably, the material can be formed of about 10% bi-component fiber and about 90% recycled cardboard fiber. The bi-component fiber can be chopped and have a length of less than about 24 mm, less than about 16 mm, or a length between about 0.5 mm to about 16 mm, and can be mixtures of two or more lengths, preferably between about 1 mm to about 16 mm. The mixtures of two or more lengths can have ratios of from about 10% to about 90% of one fiber length to another fiber length and can have an average length of less than about 16 mm.

It was found that for a batt sample of about 1300GSM, about 90% cardboard with the binder being about 10% (with about 50% 1 mm length bi-component fiber and about 50% 6 mm length bi-component fiber), over 93% of the material is repulpable and therefore recyclable. It should be noted that greater than 85% repulpability is a "passing grade" for recyclability. The bi-component fibers can be between about 0.5 mm and about 16 mm polyethylene and polypropylene ("PE/PP") bi-component; and can be formed of about a 65/35 percent PE/PP mixture. Optionally, the PE/PP ratio can be between about 65/35 and about 50/50. These fibers can be, by way of non-limiting example, ES FIBERVISIONS® Polyethylene/polypropylene fiber, including EAC, EPS, ESC, ESE, EDC, Herculon T426 and Herculon T457 versions of fibers.

It was found that a sample of insulation material according to the present teachings, when tested for repulpability is repulpable and therefore recyclable. The insulation material can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, the insulation material can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. Containers that include the insulation material can be single-stream recyclable wherein all materials comprised by the container can be recycled by a single processing train without requiring separation of any materials or components of the container. The repulpability test results were as follows.

| Is sample representative of the material as a whole? (Y/N) | | Y | Y |
|---|---|---|---|
| STARTING SAMPLE | | | |
| Moisture Content | | 7.3% | 7.3% |
| Temperature Range | | 128° F. | 128° F. |
| Amount of Fiber in Charge | | 25 g | 25 g |
| Temp & pH Maintained? (Y/N) | | Y | Y |
| Hot Slurry Charged to Flat Screen, as Instructed? (Y/N) | | Y | Y |
| FINISHED SAMPLE: Oven dry mass | | | |
| Amount of Fiber Rejects | | 1.246 g | 1.261 g |
| Amount of Fiber Accepts | | 17.84 g | 17.27 g |
| Yield of Sample (% Accepts) | | 93.5% | 93.2% |
| Observe and note deposition on vessel walls, screens, moving parts, etc. | | | |
| Deposition Observed? (Y/N) | If yes, detail below. | N | N |

It was found that for a batt sample of about 1300GSM, about 90% cardboard with the binder being about 10% 1 mm bi-component fiber, over about 98% of the material is repulpable and therefore recyclable. The insulations and shipping containers of the present teachings are more than 85% repulpable with 85% repulpability being a "passing grade" for recyclability. The repulpability test results were as follows:

| Is sample representative of the material as a whole? (Y/N) | | Y | Y |
|---|---|---|---|
| STARTING SAMPLE | | | |
| Moisture Content | | 7.3% | 7.3% |
| Temperature Range | | 128° F. | 128° F. |
| Amount of Fiber in Charge | | 25 g | 25 g |
| Temp & pH Maintained? (Y/N) | | Y | Y |
| Hot Slurry Charged to Flat Screen, as Instructed? (Y/N) | | Y | Y |
| FINISHED SAMPLE: Oven dry mass | | | |
| Amount of Fiber Rejects | | 0.391 g | 0.296 g |
| Amount of Fiber Accepts | | 17.83 g | 19.28 g |
| Yield of Sample (% Accepts) | | 97.9% | 98.5% |
| Observe and note deposition on vessel walls, screens, moving parts, etc. | | | |
| Deposition Observed? (Y/N) | If yes, detail below. | N | N |

Thermoplastic binder fibers are provided having a weight of less than about 0.2 pounds per square foot and, more particularly, preferably about 0.1875 pounds per square foot. The remaining reinforcement fiber is greater than about 0.8 pounds per square foot, and preferably about 1.0625 pounds per square foot. The binder fibers are preferably a mixture of fibers and paper components passed through a hammer mill.

The materials according to the present teaching can have a compression resistance of between about 0.3 psi and about 1.4 psi for compression thickness between about 25% and about 50%. For example, a ⅛" insulation pad has a compression resistance at about 25% thickness of about 0.451 psi. The same ⅛" pad has a compression resistance at about 30% of about 0.564 psi. The same ⅛" pad has a compression resistance at about 50% of about 1.81 psi. A ¼" pad has a compression resistance at about 25% of about 0.425 psi. The same ¼" pad has a compression resistance at about 30% of about 0.547 psi. The same ¼" pad has a compression resistance at about 50% of about 1.566 psi. A ½" pad has a compression resistance at about 25% of about 0.356 psi. The same ½" pad has a compression resistance at about 30% of about 0.458 psi. The same ½" pad has a compression resistance at about 50% of about 1.36 psi. The same ½" insulation pad can have a tear resistance of between about 8.4 and about 8.8 lbs.

When an insulated pad of the present disclosure is tested according to ASTM Specification C165-07 about 50% relative humidity, the material has a modulus of elasticity of about 2.64 psi. With a load of about 0.020 psi, it sees about a 5% strain. With a load of about 0.29 psi it sees about a 10% strain, and with a load of about 0.4 psi it sees about a 15% strain. The density of the material can be less than about 5 pounds per cubic foot and preferably about 3.5 pounds per cubic foot. The thermal conductivity of the material can be about 0.254 (BTU in/h ft^2 Temp F), the thermal resistance can be about 1.577 (Temp F Ft^2 H/BTU), and the thermal resistivity can be about 3.943 (Temp F Ft^2 h/BTU in). When tested according to ASTM Specification C165-07, the tested pad also has an R value of about 1.577.

The insulative pad 46 is formed by heating the paper fiber batt 22 in the oven to a temperature greater than about 350° F. and, more preferably, to a temperature of about 362° F. Such heating causes the binder fibers to melt and couple to the non-binder fibers, thus causing fibers to adhere to each other and solidify during cooling. Upon cooling, the binder fibers solidify and function to couple the non-binder reinforcement fibers together as well as function as reinforcement themselves.

The insulative paper fiber batt 22 is heated to form the insulative pad 46 so it has a density of less than about 10 pounds per cubic foot. The insulative pad 46 preferably has a density of less than about 10 pounds per cubic foot and, more preferably, about 8.3 pounds per cubic foot with a thickness of about ¼ inch.

After compression, the slab 10 is converted to a paper fiber insulative batt 22, which can be manufactured fiber compositions formed by passing recycled cardboard through a mill such as a hammer mill. The batt 22 can contain small amounts of water soluble adhesive or meltable fibers such a polypropylene fiber. Optionally, randomly distributed natural fibers such as cotton and binder fibers having lengths between about ¹⁄₁₆ inch to about 1.5 inches and a denier of between about 5 and about 12 are used to form the paper fiber batt 22, which is processed to form the insulative pad 46.

The fibers are then passed through a cooled transfer tube 39 and cooled to room temperature. The cooled transfer tube 39 drops the temperature of the adhesive cooled fibers. After chilling, the fibers are again mixed at the mixing operation and transported to the forming machine 40. The forming machine uses a belt or vibrating hopper to evenly distribute the coated fibers onto a transport screen mesh. The fibers are heated to about 60° C. and formed into a non-compressed continuous slab. The material is weighed to ensure proper density and thickness of the finished product. Prior to compression, a release agent is sprayed onto the exterior surface of the batt to prevent the sticking of the batt to the conveyor belts. The release agent can be from the group consisting of soaps, fatty acids, waxes, silicones, and fatty acid salts.

An application of from about 1 to 20% MDI, preferably from about 2 to 10%, and more preferably from about 4 to 7%, based on the oven dry weight of the fiber is generally employed. The batt formed has material properties described in U.S. Pat. No. 6,986,229, incorporated herein by reference.

Significantly faster line speeds have been achieved with the low volume polymeric MDI-containing binders of the present invention—a significant cost savings. In addition, the polymeric MDI-containing binders of the invention result in superior physical and mechanical properties in the resulting fiber matt product. For example, floor underlayment with higher internal bond strength and reduced edge swelling can be produced as compared to floor underlayment produced with conventional, commercially available polymeric MDI-containing binders as described in U.S. Pat. No. 6,562,173, herein incorporated by reference. Optionally, binding in the matt can be accomplished using both binder fibers and an MDI adhesive.

Optionally, the system can use a pair of vapor barrier supply rollers 126 are also located downstream of the tension rollers 118 and serve to supply a vapor barrier layer 206' and 206 to each of the two partial thickness pads 200' and 200. The vapor barrier preferably is a plastic sheet material, typically about ½ to about 1 mil in thickness. The vapor barrier, as the name implies, prevents the travel of vapor (usually water vapor) through the textile pads 210' or 210. In the preferred embodiment, the vapor barrier layers 206' and 206 is coextruded polyethylene, but alternatively any flexible vapor barrier of a suitable thickness may be used.

The pair of pressure rollers 129 are downstream of the adhesive appliers 123 and the vapor supply rollers 126. The pair of pressure rollers 129 bring together the two partial thickness pads 200' and 200 and the two vapor barrier layers 206' and 206 to form the two textile underlayment pads 210' and 210. The pair of pressure rollers 129 heat and partially compress the batts during the bonding of the adhesive to form the two textile underlayment pads 210' and 210.

In the preferred embodiment, the pressure rollers 129 apply about 400 psi (pounds per square inch) of pressure to the two partial thickness textile pads 200' and 200 and to the vapor barrier layers 206' and 206. In addition, the pressure rollers 129 are maintained at a temperature of about 200 degrees Fahrenheit. The heating partially softens or breaks down the vapor barrier to make it pliable and to aid in penetration of the vapor barrier by the adhesive.

Downstream of the pressure rollers 129 is a pair of take-up rollers 132. The pair of take-up rollers 132 may be used to roll up the finished textile underlayment pads 210' and 210. The finished textile underlayment pads 210' and 210 may be used as a floor underlayment, a laminate floor underlayment, as part of a paint drop cloth, etc.

Each sample binder was emulsified with water at an about 1:1 ratio by weight and injected into the blowline to treat the fibers by mixing the fibers with the emulsified sample binders. During this stage, the flow rate through the blowline was about 100 Kg per hour and the emulsified sample binder flow rate was about 100 g per minute. After treating the fibers with the emulsified sample binders, the treated fibers were passed through an about 2.7 meter diameter by about 89 meter in length flash-tube dryer at temperatures of about 90° C. inlet and about 55° C. outlet temperature, thus reducing the moisture content of the treated fibers to about 12 to 14 percent (oven dry basis, which was calculated by dividing the weight of the dried by the weight of the water in the wet and multiplying by 100).

The continuous slab is transported to an oven where the slab is heated and compressed between two porous conveyor belts. Steam is applied through the belts to activate the MDI adhesive. The above-described process of forming medium density fiber matt is intended to be illustrative and should not be construed as limiting the present invention.

The dried, treated fiber was then collected in a storage bin prior to matt formation. Matts were then formed, weighed and pre-compressed on a continuous compression belt on line to consolidate the fiber matts, and cut to press-length size. Next, the pre-compressed matts were subjected to a final pressing step in a heated press consisting of porous belts which were each covered with release agent. The closing of the press consisted of a two-stage close, followed by a hold at final position, and then a decompression stage to allow for a slow release of steam pressure. The floor underlayment was pressed to a thickness of about 2.5 to 10 mm. The final product is flexible inasmuch as it is rolled prior to shipment.

The test floor underlayment was then each tested for physical and mechanical properties in accordance with ASTME90-97, ASTME413-97. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Additionally, the density of the fiber batt can vary through the textile product. In this regard, the MDI matt can have a higher density on outside surfaces of the matt.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for producing a textile fiber matt comprising:
    a) providing fibers into a blowline;
    b) providing an adhesive having, a content of less than about 20% by weight of the fibers into the blowline to treat the fibers;
    c) pressing the fibers to form a flexible fiber matt having a predetermined compression resistance.

2. The method of claim 1, wherein providing an adhesive having a content of less than about 20% by weight to the blowline comprises providing a polymeric adhesive into the blowline.

3. The method of claim 2, wherein the polymeric adhesive has a polymer content of about 8% by weight or less.

4. The method of claim 2, wherein the polymeric adhesive is of about 6% by weight or less.

5. The method of claim 2, wherein the polymeric adhesive contains and emulsifiable adhesive.

6. The method of claim 5, wherein the emulsifiable adhesive is emulsified.

7. The method of claim 1, wherein the flexible fiber matt is water repellent.

8. A method for producing a textile fiber matt comprising:
    a) providing fibers selected into a blowline;
    b) providing binder into the blowline to form a mixture of fibers and binder; and
    c) pressing the fibers in the presence of heat to form a flexible textile fiber matt to a predetermined density and mixture having less than 8% by weight binder and more than 85% by weight textile fibers.

9. The method of claim 8, further comprising providing an adhesive binder of about 10% by weight or less into the blowline.

10. The method of claim 9, further comprising mixing an adhesive binder in the blowline to treat the fibers to form a mixture having less than 8% by weight adhesive and more than 85% by weight fibers.

* * * * *